United States Patent Office 3,008,969
Patented Nov. 14, 1961

3,008,969
4-SUBSTITUTED-7-CARBOALKOXYAMINO-COUMARINS
John E. Pretka, Wilmington, Del., assignor to American Cyanamid Company, New York, N.Y., a corporation of Maine
No Drawing. Filed May 21, 1958, Ser. No. 736,690
9 Claims. (Cl. 260—343.2)

This invention relates to a new ring-closure method which permits the synthesis of compounds that have a 5,6-benzo-α-pyrone nucleus, and to a new class of compounds which have the 5,6-benzo-α-pyrone structure. The common name for 5,6-benzo-α-pyrone is "coumarin" and this term will be used in its generic sense throughout the specification and claims to designate a compound having the structure:

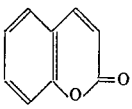

and its derivatives. More specifically, it relates to a process for preparing 7-aminocoumarins by condensing β-dicarbonyl compounds with m-hydroxyphenylcarbamic esters, followed by hydrolysis of the carbamate group. More specifically, also, it relates to the new intermediate coumarin-7-carbamate esters.

Coumarin and its derivatives have been previously prepared by ring-closure methods. Pechmann and Schwab described the compound 4-methyl-7-aminocoumarin in Berichte, vol. 32, p. 3696. It was prepared by the reaction of the meta-aminophenol with ethyl acetoacetate in an anhydrous alcohol suspension of zinc chloride. This procedure appears on paper to be quite straightforward; but, in practice, attempts to follow it produce mixtures of all kinds of isomeric products from which the separation of the desired 7-aminocoumarin is extremely difficult. One of the principal side reactions is undoubtedly the formation of the isomeric 7-hydroxycarbostyril by reaction with the free amino group.

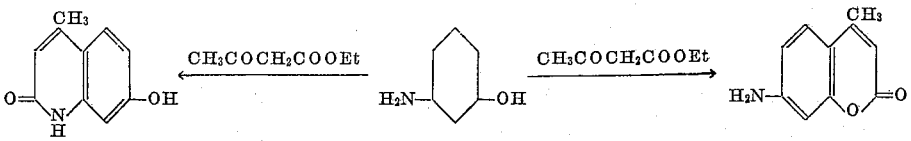

When the amino group is blocked by alkyl radicals the preparation of N-alkyl substituted 7-aminocoumarins proceeds with great ease and none of the above complications are encountered.

The increasing interest in derivatives of coumarins as whitening agents for textiles of various sorts makes desirable a cheap, good synthesis of coumarin and its derivatives, having an unsubstituted amino group in the 7-position. The normal way to protect an amino group in a reaction of this type, namely acylation, is not effective. For example, m-acetamidophenol does not react with acetoacetic ester to give any appreciable yield of 7-acetamido-4-methylcoumarin.

I have found, much to my surprise, that the carbalkoxy group not only protects the amino group in meta-aminophenol and its substitution products, but also exerts a marked activating influence on the position para to the nitrogen atom. This results in facile reactions and excellent yields of coumarins. By contrast, other protecting groups such as acyl and carbamyl, although they do effectively block the amino group, fail to activate the para position and lead to poor yields of impure coumarins. I know of no reason why this difference in activation should occur and do not wish to be limited to any theory thereon. There was no way to predict that the carbalkoxy would work when the common acyl derivatives do not.

The general type reaction carried out in my invention can be illustrated by the following chemical equation:

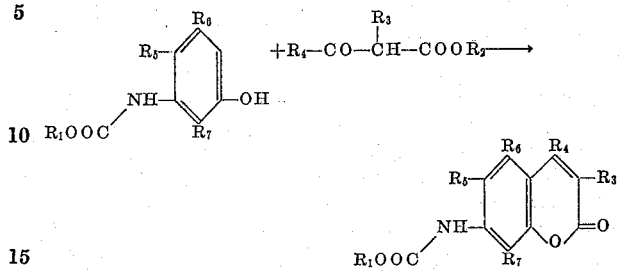

where $R_1$ may be an alkyl, aryl or aralkyl radical. $R_2$ may be any organic radical but in general the compounds in which $R_2$ is a lower alkyl radical are most readily available. $R_3$ may be hydrogen, halogen or an organic radical such as alkyl, aryl, carboxyalkyl and esters thereof, carboxyaryl and esters thereof, etc. $R_4$ may be hydrogen or an organic radical such as alkyl, aryl, alkoxy, carboxyalkyl and esters thereof, carboxyaryl and esters thereof, etc. The radicals $R_3$ and $R_4$ may be joined to form part of a polymethylene ring. $R_5$, $R_6$ and $R_7$ may be hydrogen, halogen, a lower alkyl radical or a lower alkoxy radical.

Compounds having the formula:

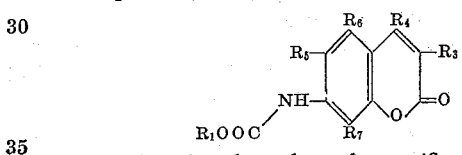

will be referred to throughout the specification and claims as esters of a coumarin-7-N-carbamic acid.

By my new process ring-closure may be effected with any known β-dicarbonyl compound, usually a β-keto ester. Thus by the proper choice of a β-dicarbonyl compound it is possible to get the desired substituents in the 3- or 4-positions of the coumarin. Among the β-dicarbonyl compounds which are usable in my invention are ethyl acetoacetate; its alpha-alkyl derivatives such as ethyl alpha-methylacetoacetate, ethyl alpha-ethylacetoacetate; its alpha-carboxyalkyl derivatives such as diethyl alpha-acetyl succinate; its higher homologues such as ethyl propioacetate and ethyl butyroacetate as well as alpha-alkyl and carboxyalkyl derivatives of these higher homologues such as acetone dicarboxylic ester; aroyl acetates such as ethyl benzoylacetate and alkyl and carboxyalkyl derivatives of the aroyl acetates as well as ring substitution products thereof. Cyclic keto esters, such as ethyl 2-ketohexahydrobenzoate, ethyl cycloheptanone-carboxylate or ethyl cycloheptanone-2-carboxylate, react in the same manner as a β-keto ester in my process. Even more reactive substituents may be present in the β-keto esters. Thus, ethyl α-allylacetoacetate may be used and, even more surprisingly, ethyl α-chloroacetoacetate was found to give an excellent yield of the corresponding 3-chlorocoumarin derivative. Other β-dicarbonyl compounds which can be used include esters of oxalacetic acid, alphaacetylbutyrolactone, alpha-(2-chlorethyl)acetoacetic ester, 1-indanone-2-carboxylic acid esters, formylacetic esters, and the like. The acetals of some of these compounds are obtainable commercially and of course react in the same manner and are the equivalent of the free carbonyl compounds. In most of these esters the name implies or specifies the ethyl ester, but in all cases the other alkyl esters such as the methyl, butyl, and the like are equivalent. Any organic ester can be used but only the lower alkyl esters are sufficiently readily available to be usable economically.

It is an important advantage of my new process that the ring-closure is a general reaction that will take place with aromatic carbocyclic carbamates having a hydroxyl group meta to the carbamate group. Substituted meta-hydroxyphenylurethanes may be used to produce coumarins which are substituted in the benzene ring. Compounds which may be used are 3-hydroxy-6-methylphenyl-urethane, 3-hydroxy-5-ethylphenylurethane, 4-hydroxy-2-carbethoxyamino-diphenyl, 4 - hydroxy - 2 - carbethoxy-aminodiphenyl ether, 4-carbethoxy-amino-2-naphthol and the like. In addition, coumarins containing ether or halogen substituents may be obtained by starting with 3-hydroxyphenylurethanes containing substituents such as methoxy, ethoxy, allyloxy, phenoxy, chloro or bromo, etc., in the 2,5 or 6 positions. Any of these may be reacted with a β-dicarbonyl compound to produce substituted 7-aminocoumarins, which have alkyls, aryls, or fused arylene substituents on the benzene ring. There are however definite restrictions on the further substituents permissible. First, the position para to the nitrogen and ortho to the hydroxyl must be unsubstituted, in order to permit the ring closure to take place. Second, the aromatic carbamate must have no electron withdrawing substituents, otherwise the ring closure is inhibited. These are the so-called negative substituents of classical organic chemistry, the groups which direct a second substitution in a benzene ring to which they are attached predominantly in the meta position, and are so listed in textbooks of organic chemistry. They include the following:

```
—NO2
—SO3H
—CHO
—C=O—
—CN
—SO2—
```

Thus, it can be stated that in general any ester of a m-hydroxyaryl carbamic ester free of electron withdrawing groups can be used. The 1,3 relation of the hydroxy and carbamate substituents must be maintained and the position para to the carbamate nitrogen must be unsubstituted. The aryl radical may be a fused ring system of less than three rings as well as a simple mononuclear ring. The rings should be carbocyclic six-membered rings.

Many cyclizing agents may be used to effect this condensation. Strong aqueous sulfuric acid, solutions of hydrogen bromide in acetic acid, solutions of hydrogen chloride in absolute alcohol, anhydrous zinc chloride, strong aqueous phosphoric acid and solutions of sulfuric acid or phosphoric acid in acetic acid are effective reagents. In general, the cyclizing agents which may be used are strongly acid reagents with good dehydrating power. Of the agents listed above, strong aqueous sulfuric acid (specific gravity about 1.68) is preferred because it is readily available and the product may be easily isolated in good yields.

The starting material is prepared by the reaction of an ester of chloroformic acid with a meta-amino phenolic compound. Since in the preparation of the 7-aminocoumarin, the carbamate group is to be hydrolyzed anyway, one may use any available ester, such as the lower alkyl esters, e.g. methyl, ethyl, propyl, butyl and the like. The benzyl, phenyl, naphthyl and other chloroformic esters will work but are seldom used because of their greater cost.

The condensation to the coumarin is effected by mixing the carbamate, the beta-keto-ester and the condensing agent and stirring the mixture at room temperature until complete reaction has occurred. Depending on the reactants and on the condensing agents being used this may vary from very short times to a number of hours. The reactants are used in approximately stoichiometric proportions. Slight excesses of either reactant may be used but such excesses are lost in isolation and a close approximation to stoichiometric proportions or a very slight excess of the more easily procured keto-esters is definitely preferable. The product may be isolated by drowning the reaction mixture in water, filtering and washing the crude product. Such a crude product can be readily purified by recrystallization from organic solvents.

The carbamate is hydrolyzed easily with loss of carbon dioxide producing the corresponding 7-amino-coumarin. Such a hydrolysis may be carried out by heating with either acid or alkali. In the case of acid hydrolysis, it may be carried out without isolation of the intermediate urethane, the strong acid condensation reaction mixture being heated, usually after diluting, to effect hydrolysis to the free amine. The 7-amino coumarins thus prepared are equivalent in all characteristics to those prepared in much poorer yields by the less effective methods of the prior art.

This application is a continuation-in-part of my co-pending application, Serial No. 392,047, filed November 13, 1953, now abandoned.

My invention can be illustrated by the following examples in which parts are by weight unless otherwise specified.

*Example 1*

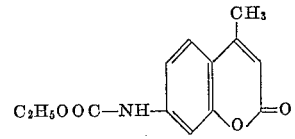

To 70 parts of a 30% solution of hydrogen bromide in acetic acid is added 8.15 parts of a 3-hydroxyphenyl-urethane and 7.02 parts of dry ethyl acetoacetate. The mixture is stirred at room temperature until the condensation is substantially complete. It is then diluted with about four times its volume of water. The precipitated white solid is filtered and washed with water. This product may be recrystallized from ethanol to produce 7-carbethoxyamino-4-methylcoumarin of melting point 191–192° C.

The identical product is obtained if 110 parts of 75% sulfuric acid is substituted for the 30% solution of hydrogen bromide in acetic acid.

*Example 2*

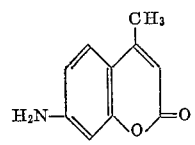

To a solution of 90 parts of sulfuric acid in 90 parts of glacial acetic acid is added 24.7 parts of 7-carbethoxy-amino-4-methylcoumarin. The mixture is refluxed for several hours and then drowned in about twice its volume of water. The drowned mixture is made faintly alkaline with sodium hydroxide and sodium carbonate is added to give a little more alkalinity. The precipitated tan solid is isolated in very good yield by filtration and washing. The 7-amino-4-methylcoumarin when recrystallized from alcohol has a melting point of 226–227° C.

This procedure can be used on any of the other coumarin-7-carbamate esters shown in the following examples, to give the corresponding 7-aminocoumarin derivatives.

Example 3

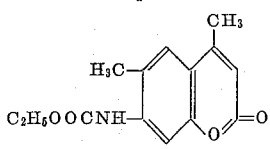

Substitution of 3-hydroxy-6-methylphenylurethane for the 3-hydroxyphenylurethane in Example 1 results in a good yield of 7-carbethoxyamino-4,6-dimethylcoumarin.

Example 4

A mixture of 8.15 parts of meta-hydroxyphenylurethane, 7.0 parts of ethyl acetoacetate, and 100 parts of anhydrous ethanol is cooled externally while dry hydrogen cyloride is passed in until the solution is saturated. The cooling bath is removed and the mixture is allowed to stir at room temperature until condensation is complete. The precipitated solid is filtered and washed. The product is identical with that of Example 1.

Similar results may be obtained if the procedure of this example is modified by using as the reaction medium equivalent quantities of a 30% solution of sulfuric acid in acetic acid or 85% phosphoric acid. Similarly, anhydrous zinc chloride may be used as condensing agent and in this case no solvent is necessary. In each of these cases a good yield of a product identical with that obtained in Example 1 is produced.

When the reaction mixture described in the preceding paragraph, containing meta-hydroxyphenylurethane, ethyl acetoacetate, and 30% sulfuric acid in acetic acid, is heated to reflux after the condensation is complete, hydrolysis to the free amino compound occurs. A product identical to that of Example 2 is obtained.

Example 5

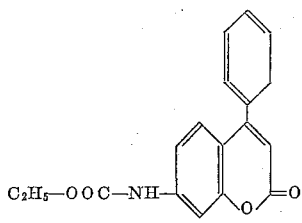

The procedures of Examples 1 and 4 are followed substituting 10.4 parts of ethyl benzoylacetate for the ethyl acetoacetate used in those examples. The product is again isolated by diluting with water and filtering and washing. It may be purified by recrystallization from alcohol to produce 7-carbethoxyamino-4-phenylcoumarin of melting point 162–162.5° C.

When ethyl-2,4-dichlorobenzoylacetate, ethyl-2-methoxybenzoylacetate, or ethyl p-toluoylacetate are used in place of the ethyl benzoylacetate, in equivalent quantities, the corresponding 4-(substituted phenyl) coumarin carbamates are obtained.

Example 6

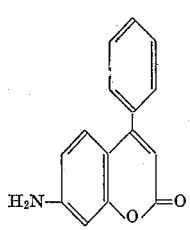

To a solution of 90 parts of sulfuric acid in 90 parts of glacial acetic acid is added 19.5 parts of 7-carbethoxyamino-4-phenylcoumarin. The mixture is refluxed until the reaction is substantially complete, drowned in about three times its volume of water, and made alkaline with sodium hydroxide. The precipitated product is filtered, washed and dried. The product can be recrystallized from alcohol to produce 7-amino-4-phenylcoumarin of melting point 220.8–221.5° C.

Example 7

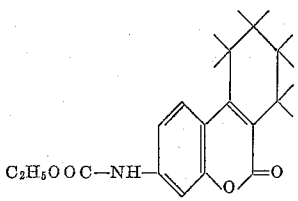

A mixture of 16.3 parts of meta-hydroxyphenylurethane, 18.7 parts of ethyl 2-keto-hexahydrobenzoate and 220 parts of 75% sulfuric acid is stirred at room temperature until condensation is complete. The reaction mixture is then poured on 450 parts of ice and the drowned mixture is diluted with 540 parts of cold water. The precipitated light yellow product is isolated by filtering and washing. It may be recrystallized from cellosolve or acetic acid to produce light yellow crystalline 7-carbethoxyamino-3,4-tetramethylenecoumarin, melting point 213.0–213.7° C.

Example 8

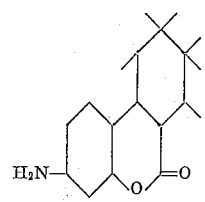

To a mixture of 180 parts of sulfuric acid and 184 parts of glacial acetic acid is added 57.4 parts of the crude product of Example 8. The mixture is refluxed until hydrolysis is complete and the solution is drowned in 1000 parts of water. The mixture is made alkaline with sodium hydroxide and the crude product is filtered, washed with water, and dried. The crude product can be purified by reslurrying in water and acidifying slightly. A small amount of light brown soluble material can be removed by filtration and the filtrate on basification precipitates a cream colored solid. This may be further purified by recrystallization from acetic acid or alcohol. In this way it is possible to obtain a product having a good analysis for 7-amino-3,4-tetramethylenecoumarin of melting point 237.8–239.5° C.

Example 9

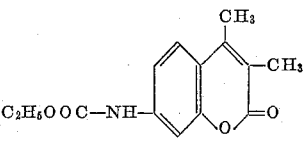

A mixture of 16.3 parts of meta-hydroxyphenylurethane, 15.8 parts of ethyl alpha-methylacetoacetate and 170 parts of 75% sulfuric acid is stirred at room temperature until the reaction is substantially complete. The mixture is then drowned in 450 parts of ice and water and the drowned mixture is diluted with an additional 450 parts of water. The precipitated product is isolated by filtering and washing. The crude product may be purified by recrystallization from solvents such as acetic acid or cellosolve to produce 7-carbethoxyamino-3,4-dimethylcoumarin of melting point 197.8–198.5° C.

Example 10

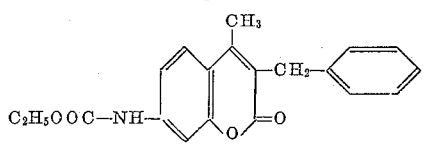

Substitution of an equivalent quantity of ethyl-α-benzyl acetoacetate for the ethyl alpha-methylacetoacetate in Example 9 resulted in a good yield of 7-carbethoxyamino-4-methyl-3-benzylcoumarin.

*Example 11*

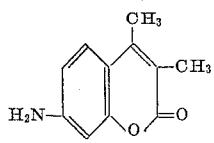

By following the procedure of Example 2 the product of Example 9 may be readily hydrolyzed to give 7-amino-3,4-dimethylcoumarin. The crude product can be recrystallized from solvents such as alcohol, acetic acid, or nitromethane to give 7-amino-3,4-dimethylcoumarin, melting at 278.5–279.5° C.

*Example 12*

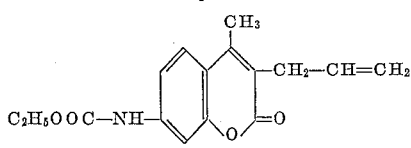

A mixture of 8.15 parts of meta-hydroxyphenylurethane, 9.16 parts of ethyl α-allylacetoacetate and 110 parts of 75% sulfuric acid is stirred at room temperature until condensation is substantially complete.

The product on isolation is obtained in excellent yield and can be purified by recrystallization from alcohol to produce a white powder, melting point 188.8–190.2° C.

*Example 13*

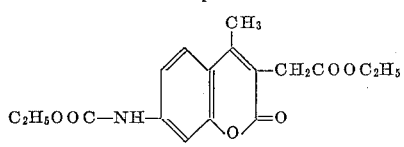

The procedure of Example 12 is followed substituting 11.6 parts of diethyl 2-acetylsuccinate for the ethyl α-allylacetoacetate used in that example. The product may be purified to give a good yield of 7-carbethoxyamino-3-carbethoxymethyl-4-methyl coumarin.

*Example 14*

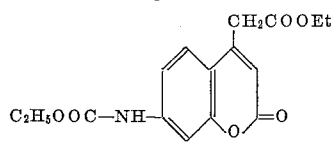

The procedure of Example 12 is followed substituting an equivalent amount of diethyl acetonedicarboxylate for the ethyl α-allylacetoacetate used in that example. The product is 7 - carbethoxyamino-4-carbethoxymethyl coumarin.

*Example 15*

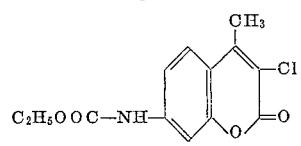

A mixture of 8.15 parts of 3-carbethoxyaminophenol 8.88 g. of ethyl α-chloroacetoacetate, and 108.5 parts of 75% sulfuric acid is stirred at room temperature until the reaction is substantially complete. The mixture is then drowned on 250 parts of ice. The solid product is isolated by filtration, washed with water followed by dilute sodium carbonate solution, and then with water again. The 3-chloro-4-methyl-7-carbethoxyaminocoumarin, which is obtained in an excellent yield, melts at 244–245° C.

*Example 16*

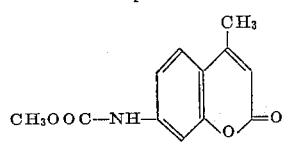

Substitution of an equivalent amount of methyl 3-hydroxyphenyl carbamate for the hydroxyphenylurethane in Example 1 gives the corresponding 7-carbethoxyamino-4-methylcourmarin. Similarly, the use of the butyl, propyl, isopropyl, octyl, lauryl and octadecyl esters of chloroformic acid in preparing the m-hydroxyphenyl carbamate give the corresponding esters of that compound, which when used in an equivalent amount in place of the hydroxyphenylurethane gives the corresponding butyl, propyl, octyl, lauryl and octadecyl esters of 4-methyl-coumarin-7-carbamic acid.

All of these products give the product of Example 2 when subjected to hydrolysis by the procedure of Example 2.

*Example 17*

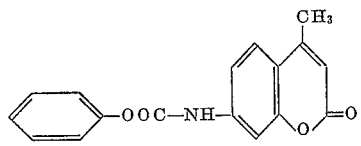

Substitution of an equivalent amount of phenyl 3-hydroxyphenyl carbamate (preparable from phenylchlorformate and metaaminophenol) for hydroxyphenylurethane in the procedure of Example 1 gives the corresponding phenyl ester of 4-methylcourmarin-7-carbamic acid. Similarly, the substitution of the following esters of 3-hydroxyphenyl carbamate (also preparable from the corresponding chlorformate) gives the corresponding esters of 4-methyl-7-carbamic acid:

o-Chlorophenyl
p-Tolyl
2,4-dimethoxyphenyl
p-Nitrophenyl
p-Benzoylaminophenyl
m-Methylsulfonylphenyl
p-Bromophenyl
p-t-Butylphenyl
p-Phenoxyphenyl
4-benzophenonyl
4-biphenylyl
4-anilinophenyl
1- and 2-naphthyl

*Example 18*

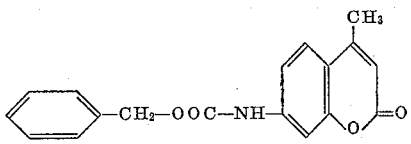

Substitution of an equivalent amount of benzyl 3-hydroxyphenyl carbamate (preparable from benzylchloroformate and metaaminophenol) for hydroxyphenylurethane in Example 1 gives the corresponding benzyl ester of 4-methylcourmarin-7-carbamic acid.

*Example 19*

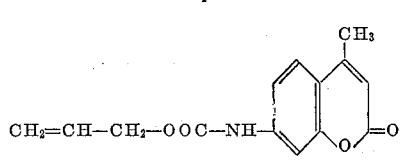

Substitution of an equivalent amount of allyl 3-hydroxyphenyl carbamate (preparable from allyl chloroformate and meta-aminophenol) for hydroxy phenylurethane in Example 1 gives the corresponding allyl ester of 4-methyl-courmarin-7-carbamic acid.

Example 20

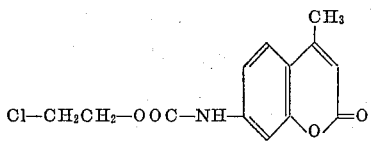

Substitution of an equivalent amount of 2-chlorethyl 3-hydroxyphenyl carbamate (preparable from 2-chlorethyl chloroformate and meta-aminophenol) for hydroxyphenylurethane in Example 1 gives the corresponding 2-chlorethyl ester of 4-methylcoumarin-7-carbamic acid.

Example 21

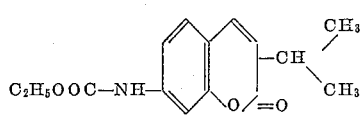

Substitution of ethyl alpha-isopropylacetoacetate in equivalent amounts for the ethyl alpha-methylacetoacetate in the procedure of Example 9 gives the corresponding ethyl 3-isopropyl-4-methylcoumarin-7-carbamate.

Example 22

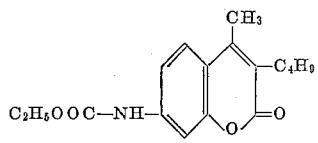

Substitution of an equivalent amount of ethyl alpha-butyl acetoacetate for the ethyl alpha-methylacetoacetate in Example 9 gives the corresponding 3-butyl-4-methyl-coumarin carbamic acid ethyl ester.

Example 23

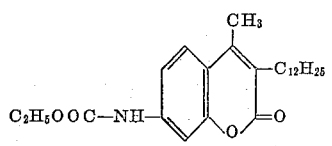

Substitution of ethyl alpha-lauryl acetoacetate in equivalent amounts in Example 9 for ethyl alpha-methyl acetoacetate gives the corresponding 3-lauryl-4-methylcoumarin-7-carbamic acid ethyl ester.

Example 24

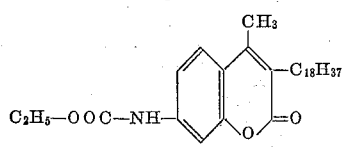

Substitution in Example 9 of an equivalent amount of ethyl alpha-octyldecylacetoacetate for the ethyl alpha-methyl acetoacetate gives the corresponding 3-octyldecyl-4-methyl coumarin-7-carbamic acid ethyl ester.

Example 25

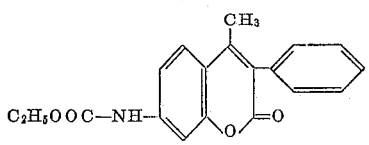

Substitution of an equivalent quantity of ethyl alpha-phenyl acetoacetate for the ethyl alpha-methyl acetoacetate in Example 9 gives the corresponding 7-carbethoxy-amino-4-methyl-phenylcoumarin. Similarly, the substitution of equivalent quantities of the alpha-1-naphthyl, alpha-2-naphthyl, alpha-tolyl, alpha-xylyl, alpha-4-methoxyphenyl, alpha-2,4-dichlorophenyl, alpha-4-benzoyl-aminophenyl and alpha-3-methylsulfonylphenyl derivatives of acetoacetic ester gives the corresponding 3-arylcoumarin carbamates.

Example 26

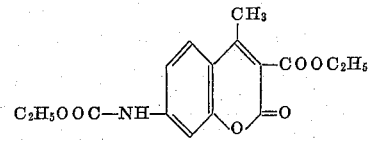

The procedure of Example 12 is followed substituting an equivalent quantity of diethyl 2-acetyl malanate for the ethyl alpha-allylacetoacetate used in that example. The product 7-carbethoxyamino-4-methyl-3-carbethoxy-coumarin is hydrolyzed, by refluxing with 20 parts by weight of 0.1 N sodium hydroxide solution per part of coumarin to the corresponding 7-amino-4-methylcoumarin-3-carboxylic acid which is isolated from the hydrolysis mixture by acidification.

Example 27

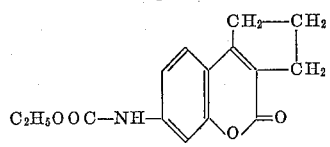

The procedure of Example 7 is followed using an equivalent amount of ethyl cyclopentanone-2-carboxylate in place of the ethyl 2-ketohexahydrobenzoate to give 3,4-trimethylene coumarin-7-carbamate ethyl ester. Similarly, when ethylcycloheptanone-2-carboxylate is used the corresponding 3,4 - pentamethylenecoumarin-7-carbamic acid ethyl ester is obtained.

Example 28

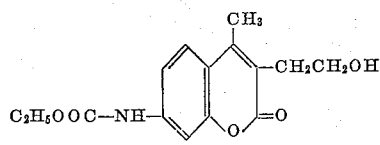

The procedure of Example 7 is followed using an equivalent amount of alpha-acetylbutyrolactone in place of ethyl 2-keto-hexahydrobenzoate to give 3-beta-hydroxyethyl-4-methylcoumarin-7-carbamic acid ethyl ester.

Example 29

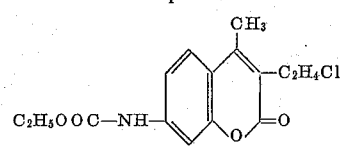

The procedure of Example 1 is followed using an equivalent amount of alpha(2-chlorethyl) acetoacetic ester (preparable by the hydrolysis and chlorination of alpha-acetobutyrolactone) in place of the acetoacetic ester to give 3-beta-chloroethyl-4-methylcoumarin-7-carbamic acid ethyl ester.

Example 30

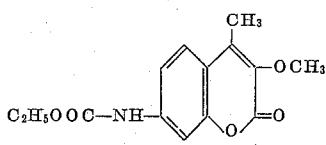

The procedure of Example 1 is followed using an equivalent quantity of alpha-methoxyacetoacetic ester in place of the acetoacetic ester to give 4-methyl-3-methoxycoumarin-7-carbamic acid ethyl ester. Similarly, when equivalent quantities of the alpha-ethoxy, alpha-butoxy or alpha-lauryloxy acetoacetic esters are used the corresponding ethoxy, butoxy or lauryloxy coumarins are obtained.

Example 31

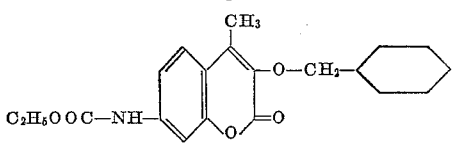

The procedure of Example 1 is followed using an equivalent quantity of alpha-benzyloxy acetoacetic ester in place of the acetoacetic ester to give 4-methyl-3-benzyloxy coumarin-7-carbamic acid ethyl ester. Similarly, when an equivalent amount of alpha-phenoxy acetoacetic ester is used the corresponding 3-phenoxy coumarin is obtained.

Example 32

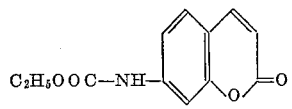

The procedure of Example 1 is followed using an equivalent amount of ethyl formyl acetate in place of the ethylacetoacetate to give coumarin-7-carbamic acid ethyl ester. Hydrolysis of this product by the procedure of Example 2 yields 7-aminocoumarin.

Example 33

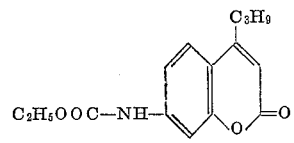

The procedure of Example 1 is followed using an equivalent amount of ethyl butyl acetate in place of the ethyl acetoacetate to give 4-propyl coumarin-7-carbamic acid ethyl ester. Similarly, when an equivalent amount of 4-stearoacetate is used the corresponding 4-heptadecyl coumarin-7-carbamic acid ethyl ester is obtained.

Example 34

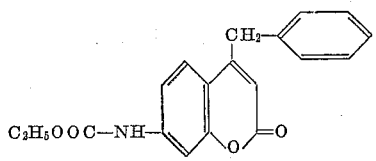

The procedure of Example 1 is followed using an equivalent amount of gamma-phenylacetoacetic ester (preparable from phenylacetic ester and ethyl acetate) in place of the ethyl acetoacetate to give 4-benzyl coumarin-7-carbamic acid ethyl ester.

Example 35

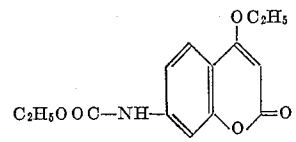

The procedure of Example 1 is followed using an equivalent amount of diethyl malonate in place of the ethyl acetoacetate to give 4-ethoxycoumarin-7-carbamic acid ethyl ester.

Example 36

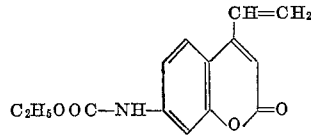

The procedure of Example 1 is followed using an equivalent amount of ethyl acryloacetate in place of the ethyl acetoacetate. The product obtained is 4-vinyl coumarin-7-carbamic acid ethyl ester.

Example 37

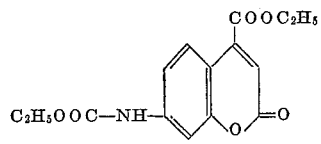

The procedure of Example 14 is followed using an equivalent amount of diethyl oxalacetate in place of the acetonedicarboxylic ester. The product obtained 4-carbethoxycoumarin-7-carbamic acid ethyl ester when heated with 20 times its weight of 0.1 N sodium hydroxide yields 7-aminocoumarin-4-carboxylic acid.

Example 38

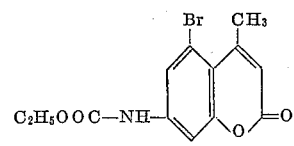

The procedure of Example 1 is followed using in place of 3-hydroxyphenylurethane an equivalent amount of 5-bromo-3-hydroxyphenylurethane (obtainable from 5-nitro-3-aminophenol by conversion of the amino group into a bromo by the Sandmeyer reaction, followed by reduction of the nitro group and reaction with chloroformic ester). The product is 4-methyl-5-bromo-coumarin-7-carbamic ethyl ester.

Example 39

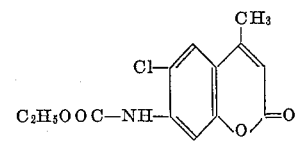

The procedure of Example 1 is followed using in place of the 3-hydroxyphenylurethane, 3-hydroxy-6-chloro phenylurethane in equivalent amounts to give 4-methyl-6-chlorocoumarin-7-carbamic acid ethyl ester. When 3-hydroxy-6-bromophenylurethane is used in equivalent amounts, the corresponding 6-bromo coumarin is obtained.

Example 40

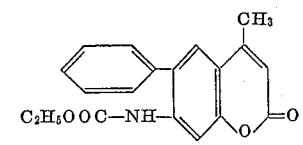

The procedure of Example 1 is followed using in place of the 3-hydroxyphenylurethane an equivalent quantity of 4-hydroxy-2-carbethoxyamino diphenyl to give 4-methyl-6-phenyl coumarin-7-carbamic acid ethyl ester.

Example 41

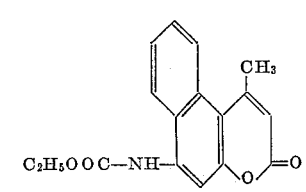

The procedure of Example 1 is followed using in place of 3-hydroxyphenylurethane an equivalent quantity of 4-carbethoxyamino-2-naphthol.

Example 42

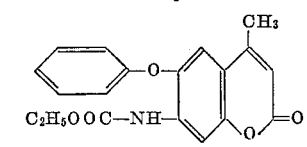

The procedure of Example 1 is followed using in place of the 3-hydroxyphenylurethane an equivalent quantity of 4-hydroxy-2-carbethoxyaminodiphenylether to give 4-methyl-6-phenoxycoumarin-7-carbamic acid ethyl ester.

*Example 43*

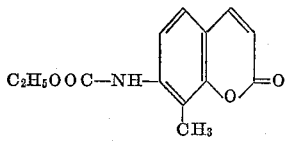

The procedure of Example 1 is followed using in place of the 3-hydroxyphenylurethane an equivalent quantity of 3-hydroxy-2-methylphenylurethane (preparable from 3-amino-orthocresol and chloroformic ester) to give 4,8-dimethylcoumarin-7-carbamic acid ethyl ester. Similarly, when equivalent quantities of 3-hydroxy-2-ethyl, -propyl, -butyl or -lauryl phenylurethanes are used the corresponding 8-alkyl coumarin derivative is obtained.

I claim:
1. 7-carbethoxyamino-4-methylcoumarin.
2. 7-carbethoxyamino-4-phenylcoumarin.
3. 7-carbethoxyamino-3,4-tetramethylenecoumarin.
4. 7-carbethoxyamino-3,4-dimethylcoumarin.
5. 7-carbethoxyamino-3-chloro-4-methylcoumarin.
6. A process of preparing esters of coumarin-7-N-carbamic acids which comprises mixing a beta keto ester of the formula

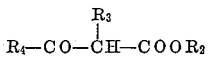

in which $R_4$ is selected from the group consisting of hydrogen, alkyl, phenyl, vinyl, carbethoxy, carbethoxymethyl, benzyl, ethoxy, tetramethylene together with $R_3$, pentamethylene together with $R_3$ and trimethylene together with $R_3$; $R_3$ is selected from the group consisting of hydrogen, chloro, alkyl, allyl, benzyl, carbethoxy, carbethoxymethyl, phenyl, naphthyl, tolyl, xylyl, methoxyphenyl, dichlorophenyl, benzoylaminophenyl, methylsulfonylphenyl, hydroxyethyl, chloroethyl, alkoxy, benzyloxy, tetramethylene together with $R_4$, pentamethylene together with $R_4$ and trimethylene together with $R_4$ and $R_2$ is a lower alkyl with a m-hydroxyaryl carbamic acid ester of the formula

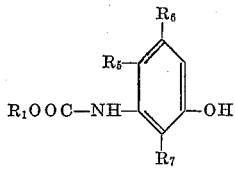

in which $R_1$ is selected from the group consisting of alkyl, benzyl, allyl, chlorethyl, phenyl, lower alkoxyphenyl, chlorophenyl, bromophenyl, nitrophenyl, benzoylaminophenyl, lower alkylphenyl, biphenylyl, anilinophenyl and naphthyl; $R_5$ is selected from the group consisting of hydrogen, chloro, bromo, phenyl, phenoxy, methyl and together with $R_6$ a benz ring; $R_6$ is selected from the group consisting of hydrogen, bromo and together with a $R_5$ a benz ring and $R_7$ is selected from the group consisting of hydrogen and alkyl in the presence of an acid condensing agent selected from the group consisting of sulfuric acid, hydrogen bromide, hydrogen chloride, zinc chloride and phosphoric acid.

7. A process of preparing 4-methylcoumarin-7-carbamic acid ethyl ester which comprises mixing acetoacetic ester with m-hydroxyphenylcarbamic acid ethyl ester in the presence of at least 50% sulfuric acid.

8. A process of preparing 4-methylcoumarin-7-carbamic acid ethyl ester which comprises mixing acetoacetic ester with m-hydroxyphenylcarbamic acid ethyl ester in the presence of a condensing agent which consists essentially of a 30% solution of hydrogen bromide in acetic acid.

9. A process of preparing 7-aminocoumarins which comprises mixing a beta keto ester of the formula

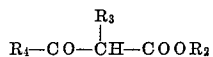

in which $R_4$ is selected from the group consisting of hydrogen, alkyl, phenyl, vinyl, carbethoxy, carbethoxymethyl, benzyl, ethoxy, tetramethylene together with $R_3$, pentamethylene together with $R_3$ and trimethylene together with $R_3$; $R_3$ is selected from the group consisting of hydrogen, chloro, alkyl, allyl, benzyl, carbethoxy, carbethoxymethyl, phenyl, naphthyl, tolyl, xylyl, methoxyphenyl, dichlorophenyl, benzoylaminophenyl, methylsulfonylphenyl, hydroxyethyl, chloroethyl, alkoxy, benzoloxy, tetramethylene together with $R_4$, pentamethylene together with $R_4$ and trimethylene together with $R_4$ and $R_2$ is a lower alkyl with a m-hydroxyaryl carbamic acid ester of the formula

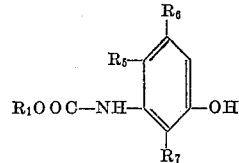

in which $R_1$ is selected from the group consisting of alkyl, benzyl, allyl, chlorethyl, phenyl, lower alkoxyphenyl, chlorophenyl, bromophenyl, nitrophenyl, benzoylaminophenyl, lower alkylphenyl, biphenylyl, anilinophenyl and naphthyl; $R_5$ is selected from the group consisting of hydrogen, chloro, bromo, phenyl, phenoxy, methyl and together with $R_6$ a benz ring; $R_6$ is selected from the group consisting of hydrogen, bromo and together with $R_5$ a benz ring and $R_7$ is selected from the group consisting of hydrogen and alkyl in the presence of an acid condensing agent selected from the group consisting of sulfuric acid, hydrogen bromide, hydrogen chloride, zinc chloride and phosphoric acid until reaction is substantially complete and subjecting the resulting carbamic ester to saponification by heating in the presence of a reagent selected from the group consisting of an acid and an alkali.

References Cited in the file of this patent

UNITED STATES PATENTS 2,647,133    Long et al. _____ July 28, 1953

OTHER REFERENCES

Dey et al.: J. Indian Chem. Soc., vol. 8, pp. 293–300 (1931).

Elderfield: "Heterocyclic Compounds," vol. 2 (1951), pp. 181, 184, John Wiley and Sons, N.Y.

Brewster: "Organic Chemistry," 2nd ed., Prentice-Hall, N.Y., May 1953, page 497.

UNITED STATES PATENT OFFICE
CERTIFICATION OF CORRECTION

Patent No. 3,008,969                            November 14, 1961

John E. Pretka

It is hereby certified that error appears in the above numbered patent requiring correction and that the said Letters Patent should read as corrected below.

Column 9, lines 17 to 21, the formula should appear as shown below instead of as in the patent:

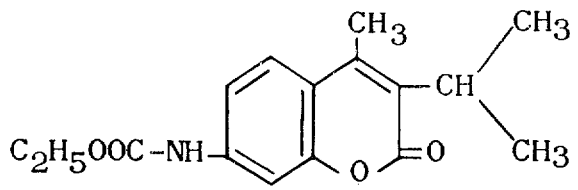

Signed and sealed this 17th day of April 1962.

(SEAL)
Attest:

ESTON G. JOHNSON
Attesting Officer

DAVID L. LADD
Commissioner of Patents